United States Patent
Fowler

(10) Patent No.: US 7,555,398 B2
(45) Date of Patent: Jun. 30, 2009

(54) SENSOR SYSTEM ERROR REDUCTION

(75) Inventor: John Thomas Fowler, Marblehead, MA (US)

(73) Assignee: TIAX LLC, Cambridge, MA (US)

( * ) Notice: Subject to any disclaimer, the term of this patent is extended or adjusted under 35 U.S.C. 154(b) by 0 days.

(21) Appl. No.: 11/735,356

(22) Filed: Apr. 13, 2007

(65) Prior Publication Data

US 2008/0046214 A1 Feb. 21, 2008

Related U.S. Application Data

(60) Provisional application No. 60/791,821, filed on Apr. 13, 2006, provisional application No. 60/873,495, filed on Dec. 7, 2006, provisional application No. 60/900,537, filed on Feb. 9, 2007.

(51) Int. Cl.
*G01D 18/00* (2006.01)
(52) U.S. Cl. ...................................... 702/104; 702/151
(58) Field of Classification Search .................. 702/104, 702/151; 73/1
See application file for complete search history.

(56) References Cited

U.S. PATENT DOCUMENTS

| 5,130,937 | A | * | 7/1992 | Kumar et al. | 702/141 |
|---|---|---|---|---|---|
| 5,170,566 | A | | 12/1992 | Fowler et al. | |
| 5,331,853 | A | * | 7/1994 | Hulsing, II | 73/514.29 |
| 5,357,802 | A | * | 10/1994 | Hofmeyer et al. | 73/382 G |
| 5,560,115 | A | | 10/1996 | Fowler | |
| 6,218,831 | B1 | | 4/2001 | Fowler | |
| 6,265,867 | B1 | | 7/2001 | Fowler | |
| 6,883,638 | B1 | * | 4/2005 | Maxwell et al. | 181/102 |
| 2002/0005717 | A1 | * | 1/2002 | Spitzer et al. | 324/252 |
| 2006/0156810 | A1 | * | 7/2006 | Brett et al. | 73/382 G |

OTHER PUBLICATIONS

Plotkin et al., "Compensation of the thermal drift in the sensitivity of fundamental-mode orthogonal fluxgates," J. Appl. Phys., 99, pp. 1-3 (2006).

* cited by examiner

*Primary Examiner*—Bryan Bui
*Assistant Examiner*—Jonathan Teixeira Moffat
(74) *Attorney, Agent, or Firm*—Lando & Anastasi, LLP

(57) ABSTRACT

A sensor system includes a first measurement subsystem including a driver and a measurement component. The measurement component includes a set of sensors for generating complementary signals representing each of one or more characteristics. The complementary signals representing a characteristic include related error components. The driver is configured to accept the complementary signals for a characteristic and to determine a measurement value for the characteristic by combining the complementary signals to reduce effects of the error components in the complementary signals.

13 Claims, 9 Drawing Sheets

| Signal | CMR Computation |
|---|---|
| Accel x-axis | $G_{xCMR} = \dfrac{G1_x - G2_x}{2}$ |
| Accel y-axis | $G_{yCMR} = \dfrac{G1_y - G2_y}{2}$ |
| Accel z-axis | $G_{zCMR} = \dfrac{G1_z - G2_z}{2}$ |
| Mag x-axis | $H_{xCMR} = \dfrac{H_{xC} - H_{xCB}}{2}$ |
| Mag y-axis | $H_{yCMR} = \dfrac{H_{yC} - H_{yCB}}{2}$ |
| Mag z-axis | $H_{zCMR} = \dfrac{H_{zC} - H_{zCB}}{2}$ |

FIG. 8

| $m$ | $\beta$ | $\phi_L$ | $f_L$ (Hz) | $T_L$ (sec) |
|---|---|---|---|---|
| 1 | 0.5 | 0.7227 | 11.5 | 0.09 |
| 2 | 0.25 | 0.2897 | 4.6 | 0.22 |
| 3 | 0.125 | 0.1337 | 2.1 | 0.48 |
| 4 | 0.0625 | 0.0646 | 1.0 | 1.0 |
| 5 | 0.03125 | 0.0318 | 0.5 | 2.0 |

FIG. 9

SENSOR SYSTEM ERROR REDUCTION

CROSS-REFERENCE TO RELATED APPLICATIONS

This application claims the benefit of the following U.S. Provisional Applications: No. 60/791,821, filed Apr. 13, 2006, titled "Orientation Sensor"; No. 60/873,495, filed Dec. 7, 2006, titled "Orientation Sensor"; and No. 60/900,537, filed Feb. 9, 2007, titled "Orientation Sensor." Each of these applications is incorporated herein by reference.

BACKGROUND

This invention relates to a sensor system.

Highly accurate compasses, magnetometers, and orientation sensors have a variety of uses including, but not limited to, vehicle navigation, underwater towed arrays, seismic measurements, and orientation sensors. High accuracy is in part obtained by correcting the compass and magnetometer readings for latitude by sensing both vertical and horizontal components of the earth's magnetic field using a three-axis magnetometer. The three-axis magnetometer not only generates signals representative of latitude and heading. New advantages in accelerometer technology now allow the development of a sensor that has no moving parts.

SUMMARY

In one aspect, in general, a sensor system includes a first measurement subsystem including a driver and a measurement component. The measurement component includes a set of sensors for generating complementary signals representing each of one or more characteristics. The complementary signals representing a characteristic include related error components. The driver is configured to accept the complementary signals for a characteristic and to determine a measurement value for the characteristic by combining the complementary signals to reduce effects of the error components in the complementary signals.

Aspects can include one or more of the following features.

The sensor system includes an orientation computation module for using the measurement value in computing an orientation.

The set of sensors includes two accelerometers substantially aligned along a common axis and fixed in opposite orientations. Each of the two accelerometers is configured to generate a different one of the complementary signals.

The set of sensors includes two (or more) accelerometers substantially aligned along each of three different axes and fixed in opposite orientations along the axes. Each of the two accelerometers for an axis is configured to generate a different one of the complementary signals.

The system includes a second measurement subsystem that has a driver and a measurement component. The measurement component is configurable for generating one of a set of complementary signals in each of a corresponding set of configurations.

The measurement component of the second measurement subsystem includes a magnetometer that is configurable to be coupled to the driver in two opposite polarities. Each of the two polarities is used for generating a different one of the complementary signals.

The magnetometer includes a two-terminal fluxgate coil, and a switching circuit that includes two configurations for coupling terminals of the coil to the driver.

The second measurement subsystem is calibrated in absence of substantial interference.

The second measurement subsystem is configured to estimate a degree of error in measurement values provided by the subsystem in the presence of an interference.

The interference includes an iron (e.g., a hard iron or soft iron) interference.

The degree of error includes a quantity characterizing an RMS error in heading.

The one or more characteristics include three substantially orthogonal components of orientation, and the measurement component includes a sensor configuration for generating complementary signals for each of the orientation components.

The first measurement subsystem is configured to measure orientation, and the sensor system further includes a second measurement subsystem for measuring magnetic characteristics.

An orientation computation module uses measurement values for orientation from the first measurement subsystem and measurement values from the second measurement subsystem for determining an orientation of the sensor.

The sensor configuration for generating complementary signals representing each of one or more characteristics represents a substantially symmetric transfer function between the characteristic and the signal.

In another aspect, in general, a magnetometer is calibrated in the absence of substantial interference. Later, the magnetometer is provides an estimate of a degree of errors, for example, a degree of RMS error in bearing, in the presence of an interference, such as in the presence of a hard iron or a soft iron interference.

In another aspect, in general, an orientation sensor includes a three-axis fluxgate device, two three-axis accelerometers, an analog to digital converter, a microprocessor, and various electronics to drive the magnetometer coils and filter and condition the data signals. A serial communication interface is also provided. The orientation sensor can be used in a number of applications including, but not limited to, weapons orientation, attitude sensing, bore holes, and vehicle navigation. The sensor provides high accuracy with low power consumption in a small package that can be used even on or near objects containing large amounts of ferrous material in either the horizontal or vertical position.

In other aspects, in general, a sensor system includes one or more of the following.

The sensor system implements an orientation sensor.

The system includes a three-axis magnetometer and dual three-axis accelerometers.

The system includes a three-axis magnetometer, dual three-axis accelerometers, and one or more axes of gyros.

The system has no moving parts.

The system implements a procedure for self-calibration of the orientation sensor without requiring external fixtures.

The system implements a calibration of an orientation sensor in the presence of large amounts of ferrous material, such as a weapon or vehicle.

The system implements a calibration to make the system substantially latitude insensitive.

The system reverses the direction of the magnetometer coils and combines the results allowing use of the instrument as either a magnetometer or a gradiometer.

The system includes accelerometers oriented in opposite directions and combines the data from these accelerometers.

A coil energizing pattern of a square wave with "off" times at the zero crossings is used.

Infinite gain feedback using double integrators is used.

Low-power consumption achieved by the implementation of different CPU states and sequencing of electronic component power settling versus reading.

Aspects can include one or more of the following advantages.

Real-time measurement of pitch, roll, directional heading is accomplished by utilizing a high through put AtoD converter, a hardware MAC (Multiplier/Accumulator), and a RISC architecture 16 bit microcontroller.

Accuracy better than 0.10 degree via IIR filtering and 24 Bit storage and processing.

The sensor system can be mounted and successfully calibrated on a weapon. The sensor can be calibrated even on weapons with large amounts of ferrous material.

Complementary pointing vectors improve accuracy by doubling signal strength and eliminating even order harmonic distortions.

Long term battery operation as well as high speed, high bandwidth, sampling can exist simultaneously in the same unit through unique computational methodology.

Auto-zeroing function permits long term stability of the magnetometers while removing electronic offsets associated with the electronics. This technique also improves the temperature stability of offset and scale factors and permits dual operation as both a magnetometer and a gradiometer.

The systems are not limited to weapons orientation. The sensor works well on ferrous vehicles and applications as diverse as antenna positioning.

A compass can measure its own error without external equipment. In prior systems, the accuracy of the internal calibration has been verified many times by using a precision "step and repeat" rotary table. Using internal calibration, such rotary table procedures can be avoided.

Other features and advantages of the invention are apparent from the following description, and from the claims.

DESCRIPTION OF DRAWINGS

FIGS. 8 and 9 are tables.

DESCRIPTION

1 Abbreviations and Definitions
 ADC Analog to Digital Converter
 DAS Digital Attitude Sensor
 DMX Digital Magnetometer with Accelerometers
 RMS Root Mean Square
 WOM Weapons Orientation Sensor.

2 Orientation Sensor

Figure 1:
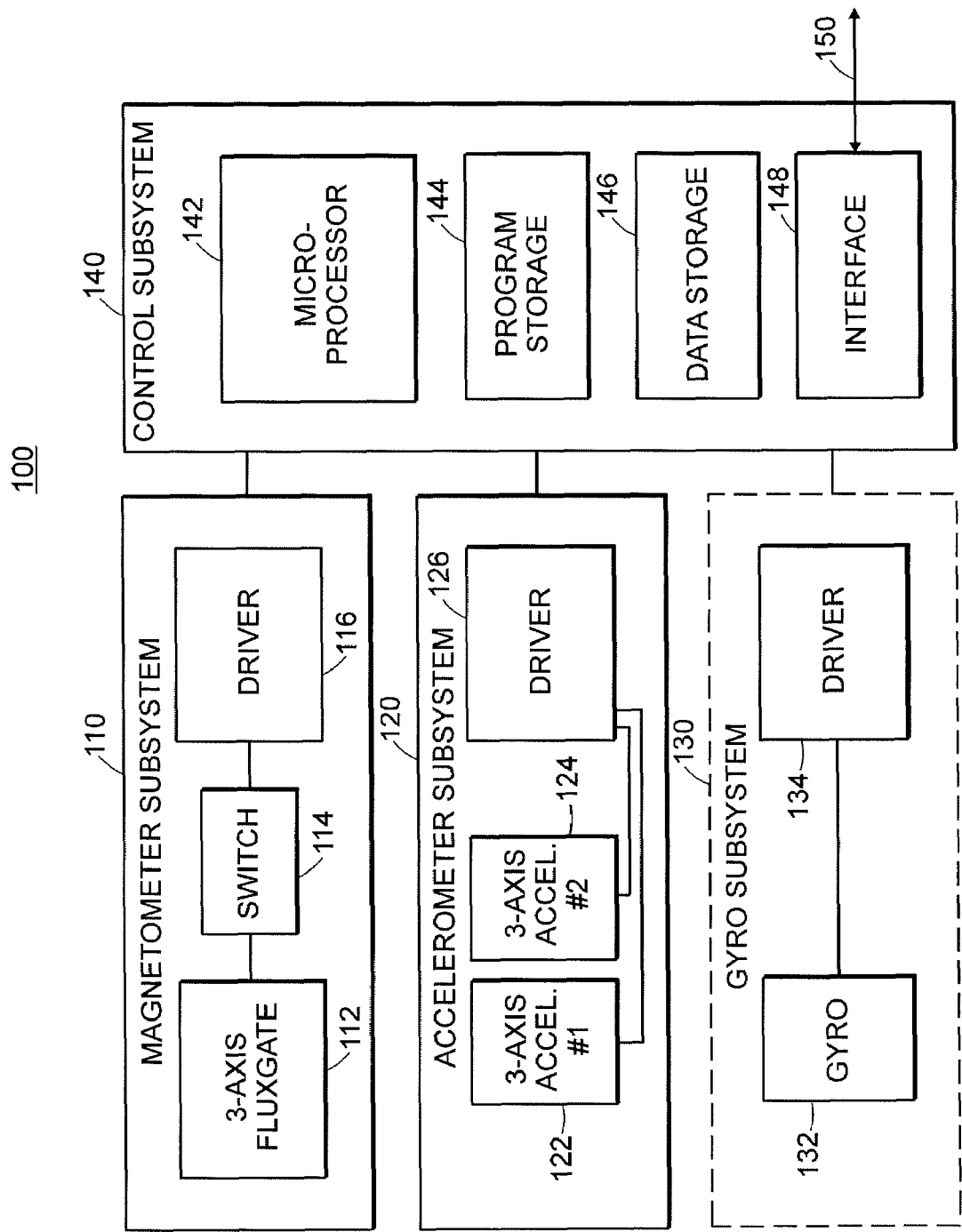
FIG. 1 is a block diagram.

Referring to FIG. 1, in an example of a sensor system, an orientation sensor 100 provides orientation information based on a number of sensors. One example of use of the orientation sensor is as a Weapons Orientation Sensor (WOM) to measure the orientation of a weapon, such as of an M16 rifle. Other examples of sensor systems that make use of similar or the same features include Digital Attitude Sensors (DAS).

The orientation sensor 100 includes a magnetometer subsystem 110, which includes a three-axis fluxgate device 112, and an accelerometer subsystem 120 that includes two three-axis accelerometers 122, 124. The magnetometer subsystems includes an analog to digital converter and various electronics to drive the magnetometer coils and filter and condition the data signals, which are collectively illustrated as a driver 116. As is discussed further below, the magnetometer subsystem 110 also includes a switch 114, which can reverse the polarity of the connections between the driver 116 and the fluxgate devices 112. The accelerometer subsystem 120 also includes a driver 126, which drives both accelerometers 122, 124. These accelerometers are mounted in substantially opposite orientations (see FIG. 2). A control subsystem 140 includes a microprocessor 142 as well as associated program storage 144 and data storage 146, and also includes an interface 148, which in some examples uses a serial communication link 150 for interchanging information with a host system. The system optionally includes a gyroscope subsystem 130, which includes one or more gyros 132 and an associated driver 134, which can provide angular rate of change data. Angular rate of change alternatively can be measured in heading, roll, and pitch by simply sampling the degree changes on those three axes per unit of time, typically the sample period.

Figure 2:
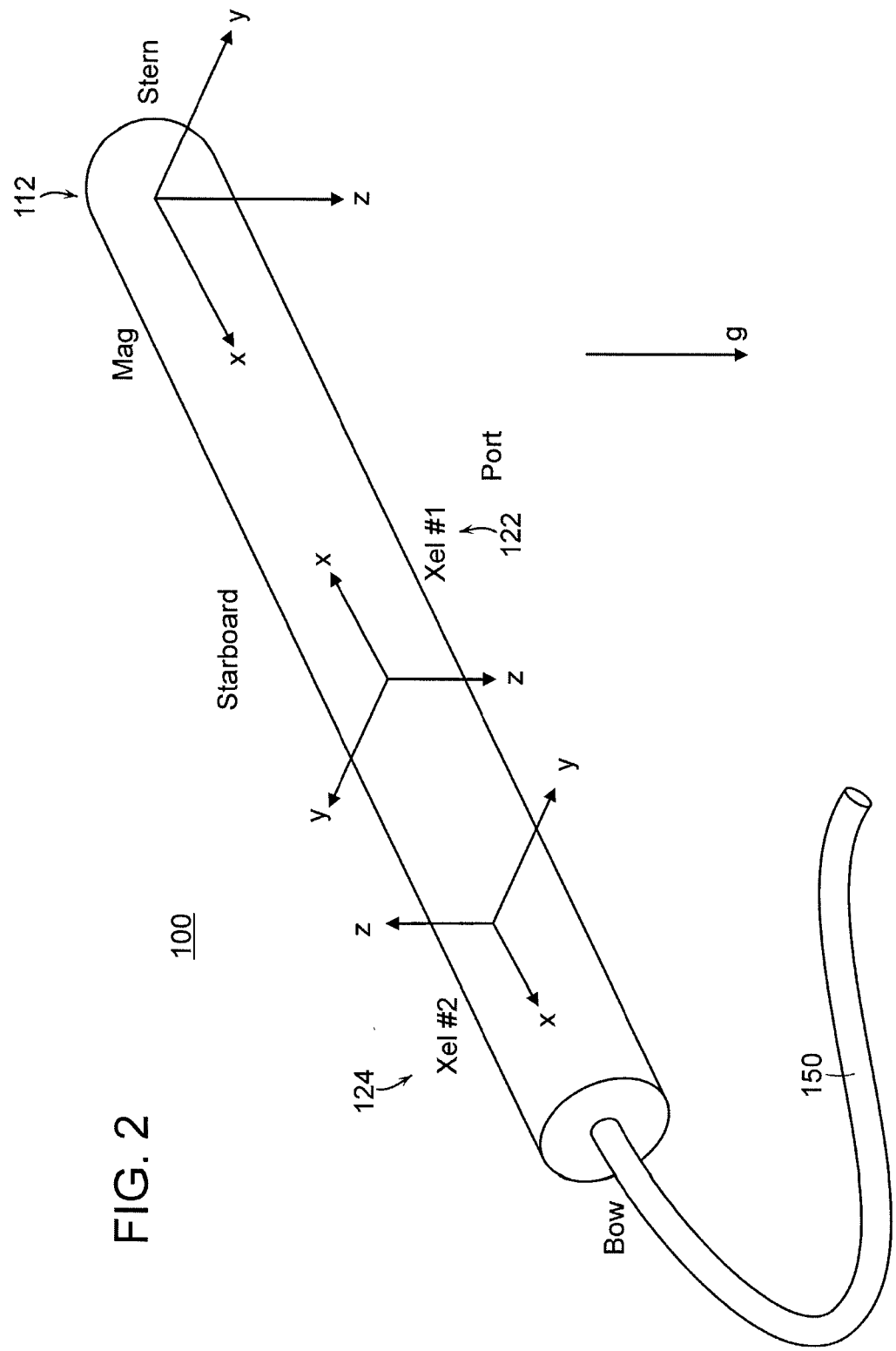
FIG. 2 is a perspective schematic view.

The magnetometer 110 includes a 3-axis fluxgate device 112 with axes designated as (x,y,z). Referring to FIG. 2, the x-axis is nominally aligned with the sensor case and points in the direction toward the electronic connector which is also generally in the direction of travel. The y-axis nominally points athwart ship to port at zero roll angle. The z-axis points vertically downward (toward the center of the Earth) at zero roll and zero pitch angles.

The accelerometer subsystem 120 includes two 3-axis accelerometer devices 122, 124. Continuing to refer to FIG. 2, the coordinate systems for the accelerometer devices are defined with the following convention. For accelerometer #1, the coordinate system is left-handed and is the same as the magnetometer coordinate system with a 180° rotation about the z-axis. For accelerometer #2, the coordinate system is right-handed with the x-axis nominally aligned with the sensor case pointing toward the electronic connector, the y-axis nominally points athwart ship to port at zero roll angle, and the z-axis points vertically upward (away from the center of the Earth) at zero roll and zero pitch angles.

The system electronics include an analog board, a digital board, two accelerometer boards, a nose board, and a coil holder board. The analog board contains the magnetometer and accelerometer analog signal control and conditioning circuits and a temperature circuit. The digital board contains the microcontroller and power supply regulation circuits, reference voltage circuits, external communications interface circuits, and a high-resolution analog to digital converter. There are two types of accelerometer boards. The first mounts the accelerometer package such that the x-axis is normal to the analog board plane (pointing away from it) and the y-axis is parallel to the analog board plane. The second mounts the accelerometer package such that the x-axis is parallel to the analog board plane and the y-axis is normal to the analog plane (pointing into it). Two of each board type are used for a total of four accelerometer boards and accelerometers. The coil holder board provides a connection backplane for the three fluxgate coils. The nose board provides a connection backplane to connect the digital board to the mechanical nose piece in which the input/output connector is mounted.

3 Calibration

A procedure for self-calibration is described in U.S. Pat. No. 4,698,912, titled "Magnetic Compass Calibration," issued to Fowler et al. in October, 1987, which is incorporated herein by reference. Embodiments of the present approach make use of techniques described in that patent as well a number of new calibration features.

Examples of the system use a calibration approach that relates to the use of the difference of Factory "Air" (without ferrous sources of deviation) calibrated values and the values calibrated by the "KAL" method (auto-calibrated in the presence of ferrous material or permanent magnets) to quantitatively determine the type (hard of soft iron) and magnitude of the external sources of deviation. The embedded firmware (e.g., in program storage 144) then gives a precise value for the "B & C" (hard iron terms) and the "D & E" (soft iron terms), and even computes its own root mean square (RMS) error. Having reported its own error terms, the system can then automatically update its registers (e.g., in data storage 146) and mitigate errors related to those terms in the measurements provided to the host system.

The calibration process involves the following steps. As part of the calibration process, the sensor rapidly samples the x and y magnetometer axes (i.e., the cosine and sine of heading). The system stores the maximum and minimum readings of each of these uncalibrated cosine and sine signals (waveforms as a function of time). In the absence of offset errors, the sum of the maximum and minimum would be zero. The average of the (signed) maximum and minimum of each of these signals yields the offset (the "B" term for the x-axis and "C" term for the y-axis) (e.g., x-bias and y-bias) after conversion to degrees. For example, the bias is due to an effect of permanent magnetism on the weapon-.

In addition to the bias terms, a y/x ratio is also computed as the average differences of y-peak-to-peak/x-peak-to-peak= (y-max−y-min)/(x-max−x-min). This becomes the "D" when converted to degrees. This term is due, for example, to soft iron along the fore and aft line of symmetry. This is called the "lubber line" on a ship, but is along the axis of the barrel for a rifle.

The "E" term is determined by measuring the phase angle between the two waveforms at the Intercardinal points (045, 135, 225, and 315 degrees) using waveform analysis techniques. This error is caused by asymmetrically positioned soft iron on either side of the sensor.

The RMS error is computed as $$RMS = (B^2 + C^2 + D^2 + E^2)^{1/2}$$

Since there are no more deviational influences in the physical model, this result is extremely close to the RMS value if computed with a precision indexer (rotary table).

This calibration forms is an iterative process with the RMS error being transmitted to the host system and every time a calibration revolution is made, the processor updates the B, C, D and E terms. At some point the RMS error will fall below the specified target and the operator can be informed that calibration can cease.

In a test of 4 WOM sensors removed after having been calibrated on the M16, they all showed about a 3° "D" term variation when removed from the weapon and run in "Air". This variation is due to the large amount of soft iron present in the barrel and the receiver of the M16. Had the experiment been run the other way in going from an "Air" calibrated sensor to being mounted on the gun, a −3° "D" term would have been generated. Typically, even large error terms can be reduced to near zero in only one "KAL" revolution. If a small residual term remains, it can be eliminated with a second pass.

Latitude insensitivity is very important if the weapon or vehicle traverses large changes in latitude. Most magnetic auto-calibration algorithms only compensate for X and Y bias errors at one particular latitude. By separating out actual X and Y bias errors from changes in X and Y biases due to the contamination from the vertical field, the sensor system is effectively insensitive to vertical field changes and therefore to latitude.

4 High Accuracy

4.1 Multiple Accelerometers

In the embodiment of the sensor system illustrated in FIGS. 1-2, two accelerometers are pointed in opposite directions to improve the pitch and roll accuracy. Using multiple accelerometers can improve accuracy. For example, assuming measurement error is statistically independent for each of the sensors, using N sensors would yield a reduction of RMS error by a factor $N^{1/2}$. If four accelerometers were installed, then a factor of two improvements could be expected.

Further reduction in error can be achieved by selecting the orientations of the accelerometers to take advantage of certain statistical dependence of the measurement error in the different accelerometers. In some examples, the axes of micromachined accelerometers are configured in opposite directions, as shown in FIG. 2. Such configurations can provide additional benefits contributing to overall accuracy and long term stability are achieved. Without being limited to by theory or motivation for the configuration, reasons that such configurations may be beneficial are as follows.

Since the sensors are MEMs devices, they are often well matched in certain errors, such as nonlinearity. By employing sensors in complementary positions, some of these nonlinear errors cancel if the difference of the two axes is taken. For example, if the sensor output can be characterized by $$Gx_1 = b_1 + m_1 X + a_1 X^2, \text{ and}$$

$$Gx_2 = b_2 - m_2 X + a_2 X^2$$

recalling that the acceleration X is opposite for the second accelerometer, the difference of the two complementary outputs for an axis will read $$Gx_1 - Gx_2 = (b_1 - b_2) + X(m_1 + m_2) + (a_1 - a_2)X^2$$

In other words the offsets and the even order nonlinearity terms tend to cancel, and the odd order terms are generally doubled. Since the residual b terms (offsets) can be measured and canceled, as well as the m terms (gain), we are left with Gx=2 mX, where m is the average of the two m terms.

Figure 5A:
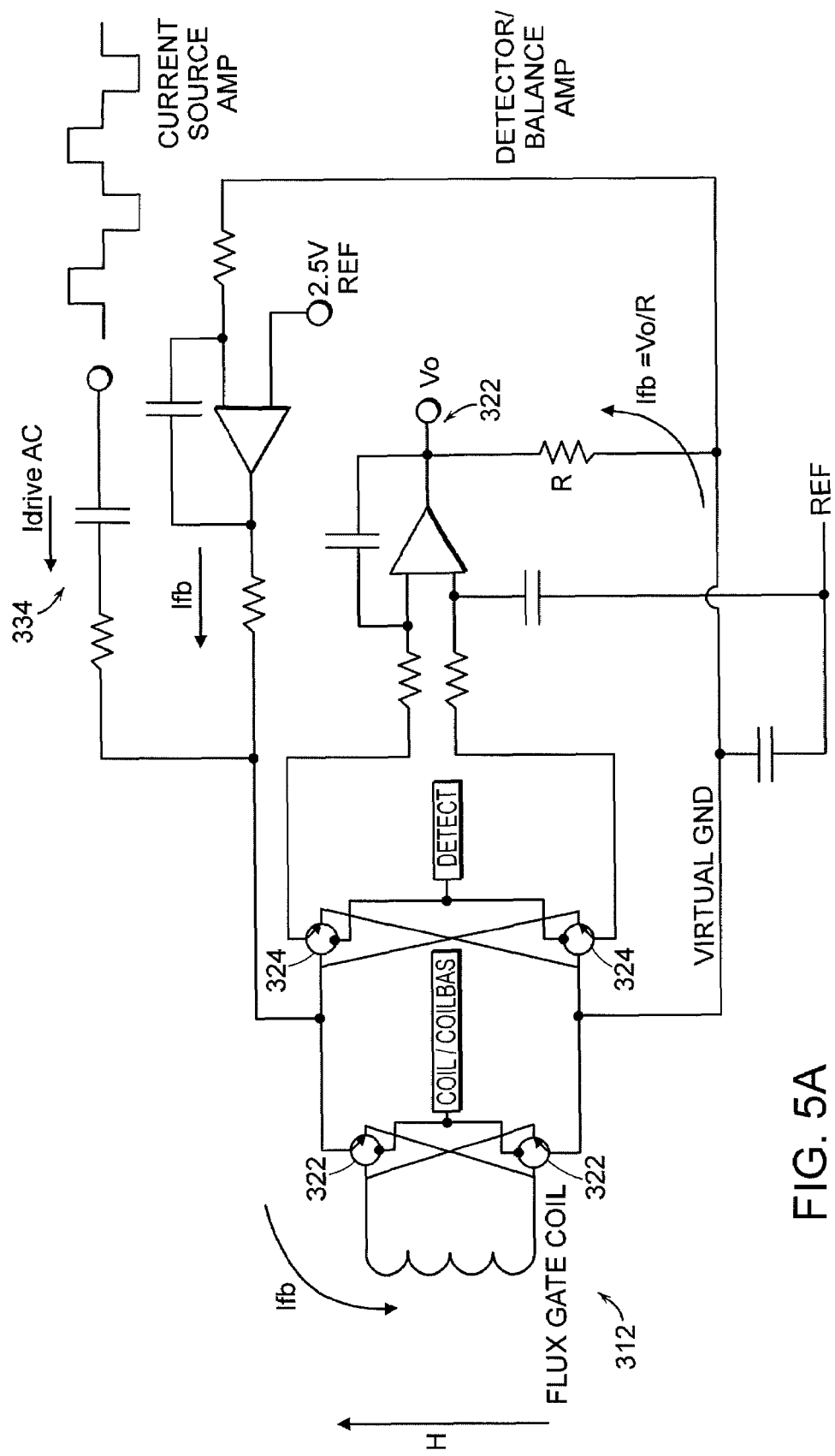
FIGS. 5A and B are circuit schematics.
Figure 5B:
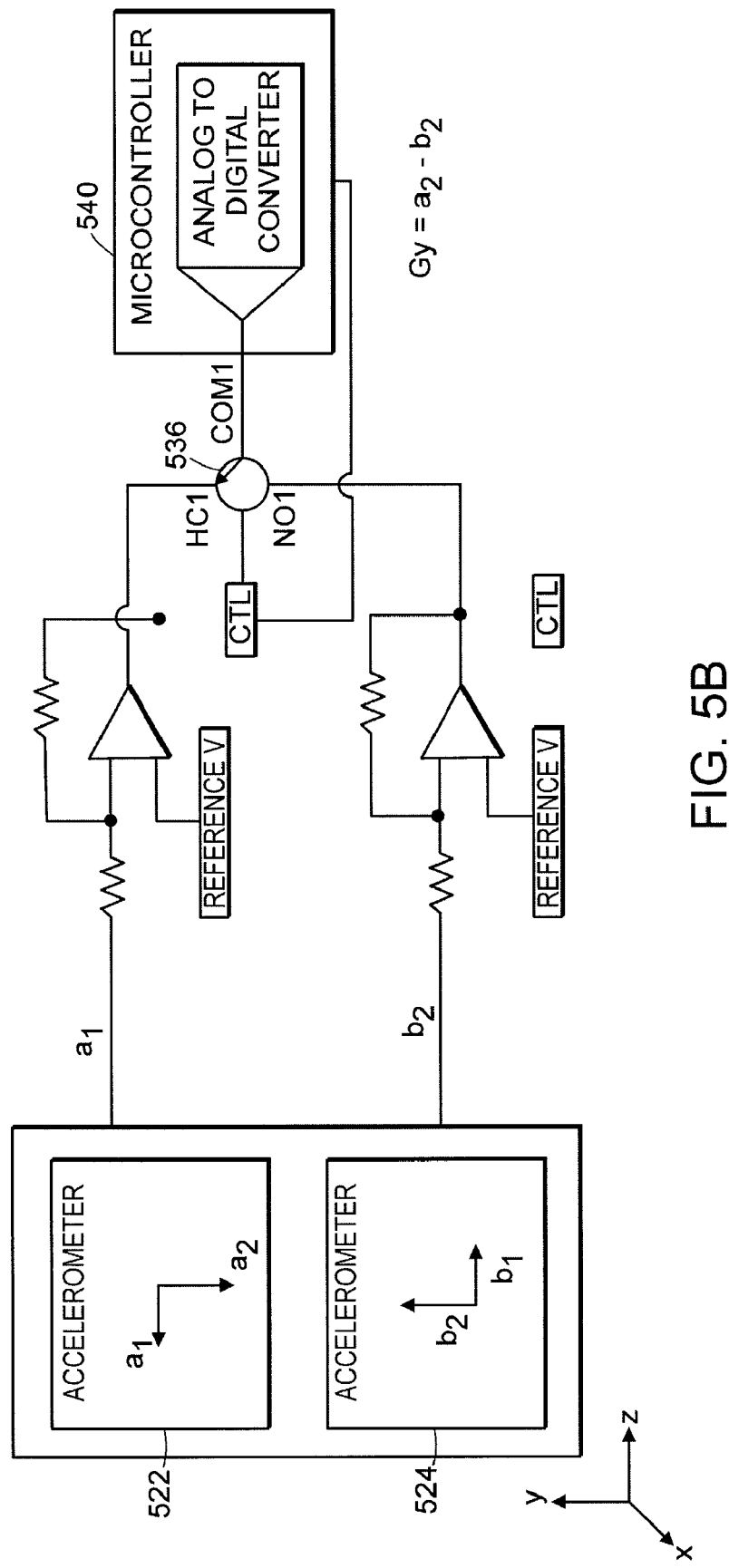

Referring to FIG. 5B, accelerometers 522 and 524, each representing one axis of 3-axis accelerometers 122 and 124 (see FIG. 1), respectively. Each accelerometer signal is passed to a double-throw switch 536 while permits an ADC 540 to read the acceleration reading from the two accelerometers in succession. The switch 536 can be synchronized with the analog-to-digital conversion. In some embodiments, the switch (or equivalent circuitry) forms an AC signal from the alternations between the accelerometers, and this AC signal can be AC coupled to circuitry for processing the signal prior to digitization. In some examples, rather than switching between the two accelerometers, and analog summation of the two signals if performed prior to digitization.

4.2 Coil Flipping

In some examples, the magnetometer subsystem 110 employs what is referred to herein as a "coil flipping" feature. Viewed generally, both the use of complementary accelerometers and electrically flipping the orientation of excitation of the fluxgate cores are examples of a general technique of using complementary configurations with complementary devices (e.g., two accelerometers) or complementary uses or excitations of a physical device (e.g., two polarities of excitation of fluxgate coils). Using complementary configurations can have a benefit of cancelling dependent measurement errors from measurements using the complementary configurations.

The coil flipping feature gives the magnetometer subsystem improved offset and high temperature stability. Referring to FIG. 1, the 3-axis fluxgate 112 is coupled to the driver 116 through a switch 114. The switch is controllable to drive each of the two-terminal fluxgate coils (one for each axis) in each of two polarities. That is, the switch 114 implements a Double Pole Double Throw (DPDT) switch allowing the polarity to be reversed.

Figure 4:
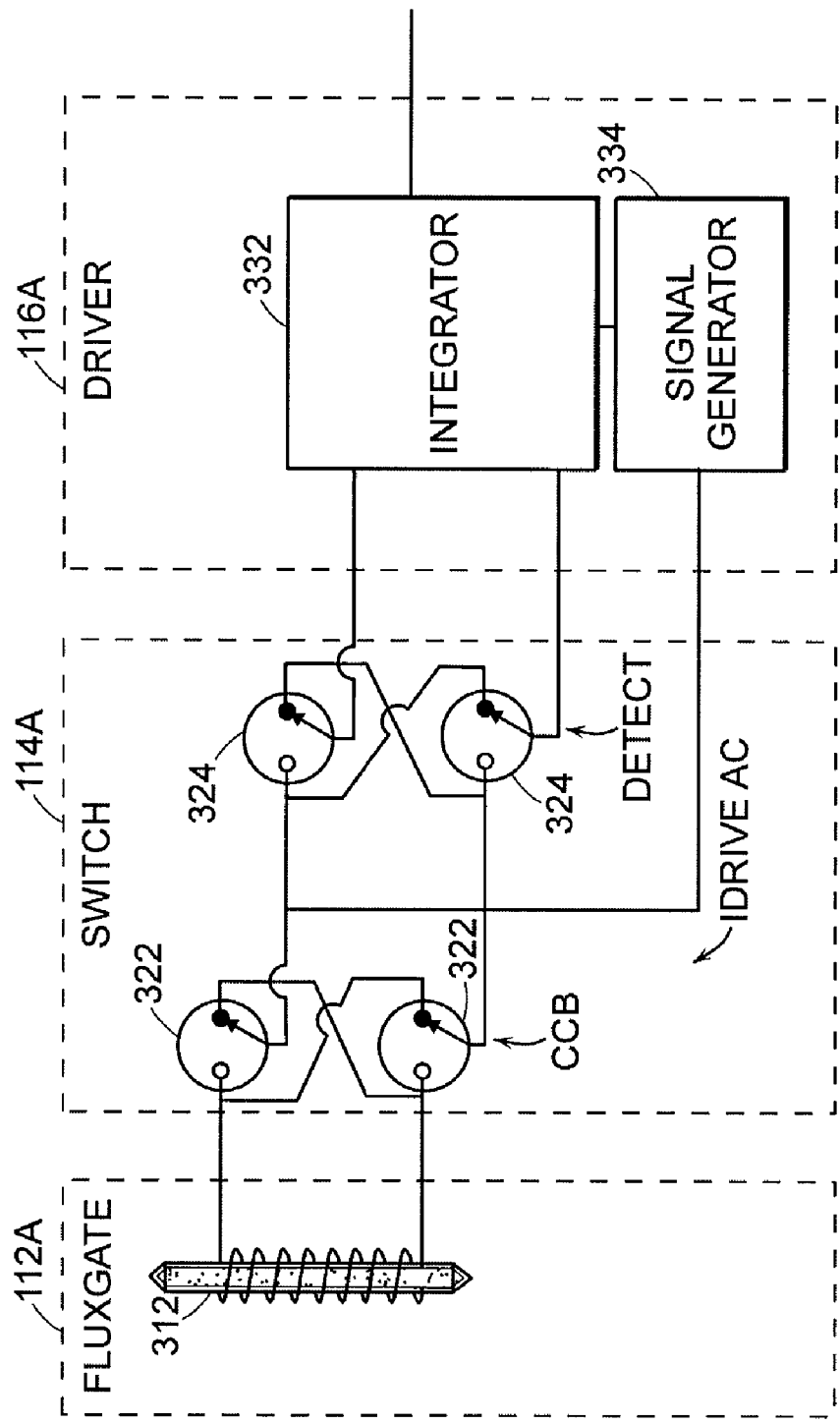
FIG. 4 is a block diagram.

Referring to FIG. 4, which illustrates elements of associated with one axis of the magnetometer subsystem 110, a fluxgate 112A includes a two terminal fluxgate coil 312. A driver 116A includes a signal generator 334, which drives the coil 312, and an integrator 332, which senses the coil 312. The switch 114A includes an arrangement of switches 322 such that the polarity of the drive to the coil can be inverted, and an arrangement of switches 324, such that together the switches 322, 324 pass the coil signal to the integrator 322 with a consistent polarity.

Figure 3:
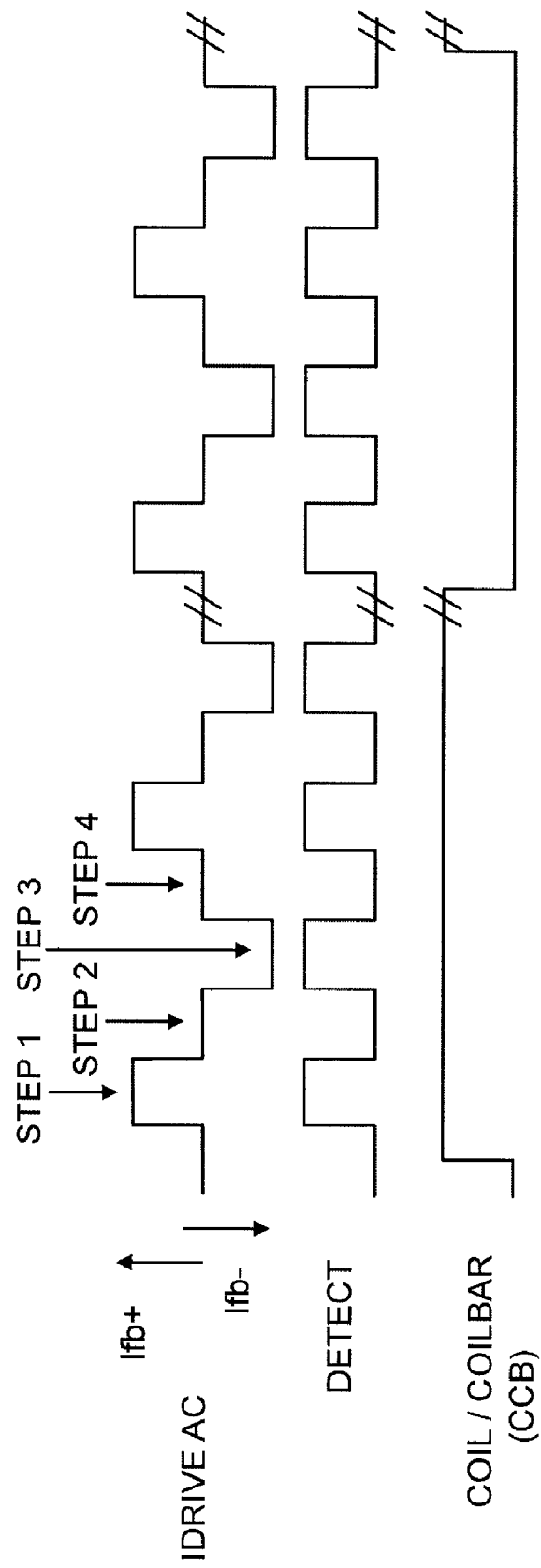
FIG. 3 is a signal timing diagram.

Referring to FIGS. 3 and 5, the coil/coil-bar (CCB) signal drives the state of the switches 322, and the DETECT signal drives the state of the switches 324. In the absence of the CCB signal flipping the orientation of the coil, the output $v_0$ is a DC signal proportional to the measured field. The CCB signal flips the orientation periodically, for example, every 32 cycles of the IdriveAC signal. This results in the output $v_0$ being an AC signal that has a peak-to-peak amplitude equal to twice the amplitude of the (DC) signal generated by the coil, e.g., 60,000 nT for the DC signal is converted to ±60,000 nT for the AC signal. In some examples, use of such an AC signal is used in an AC-coupling arrangement such that the AC signal is processed further before digitization. For example, such an AC signal may have advantages in certain applications, such as with very low field strengths.

If there are offsets associated with the electronics (e.g., in the integrator 332, signal generator 334, and feedback loop and analog-to-digital converter(s) that is not illustrated) then the effect of such offset can effectively be eliminated through the use of the switch 114A. For example, assume the fluxgate is aligned with a positive field B. Then with the switches 322 in the plus direction, the magnetometer output will read Hout1=H+off. Now if the switches 322 reverse the coil polarity, then the output will read Hout2=−H+off. If these two readings are then subtracted we get Hout1−Hout2=2H+(off−off), canceling all of the offsets in the electronics, including the A-to-D converter itself.

4.3 Fluxgate Control

As introduced above, three fluxgate coil drive and signal processing circuit channels are controlled by a small microcontroller (142, see FIG. 1) that produces a four cycle alternating waveform as shown in FIG. 3. In some examples, the three channels are entirely or effectively identical. In step 1, the coil is driven with a constant current (Idrive) in the positive direction until the core is fully saturated (Ifb+). In step 2 the current is turned off, and the energy in the coil and core is allowed to "flyback". Steps 3 (Ifb−) and 4 are a repeat of 1 and 2 but with the coil current in the negative direction. An integrator is switched at twice the drive frequency (DETECT) and captures the integral of the positive and negative excursions (Ifb+/−), as well as the "flyback energy" of the coil voltage in response to the constant current AC drive.

A schematic of a single axis of the magnetometer subsystem is shown in FIG. 5A. The Idrive AC is an AC constant current fluxgate drive. Ifb is DC Fluxgate current, which is equal to H*L/N, where H is the Magnetic field, L is the fluxgate length, and N is the number of turns of coil wire. The output Vo is equal to R*H*L/N. Note that Vo drives the current Ifb through R into a virtual ground. Neither the resistance of the coil nor any changes due to temperature affects Vo.

The output Vo of the integrator reflects the flux balance in the core as shown in FIG. 5A. The voltage produced by the coil in response to the constant current excitation is $$E = N\left(\frac{d\Phi}{dt}\right),$$

where $\Phi$ is the flux in the coil core, N is the number of turns on the coil, and t is the time during which the flux change takes place. The integrator (Detector balance amp) captures this voltage change as $E=N\int \Phi dt$. In the absence of an external field, the flux excursion in response to a no net DC constant current excitation has a zero integral. However, an external magnetic field causes an imbalance in the BH loop, causing the integrator to move toward a positive or negative voltage limit.

The integrator output is fed into a constant current source (Current source amp) that is summed with the AC constant current fluxgate drive (Idrive AC). This results in a negative feedback that re-balances the fluxgate core and produces a zero average flux within the core (null-balance). The integrator now stabilizes at a point that produces a constant current that exactly cancels any external field and results in a zero bias on the fluxgate core. This zero bias on all three magnetometers results in each magnetometer behaving as if it were non-magnetic, canceling any influence that one might have on a close neighbor. This permits a non-symmetric arrangement of magnetometers to act as if all three axes were mutually orthogonally but intersecting, a physical impossibility.

Note that in FIG. 5A, both integrators have only a capacitor across their feedback terminals (output connected to non-inverting input). This arrangement may have advantages related to sensitivity to temperature variation.

5 Low Power Operation

Examples of the sensor system 100 can perform data acquisition of magnetometer and accelerometer data, filter it with an IIR filter, and store the filtered resulting vectors as raw values. As a mechanism for reducing power consumption, only when data is requested does it calibrate the raw data, transform the vectors to the horizontal and vertical planes and transmit the results. This technique combined with turning elements on and off reduces power while preserving bandwidth.

6 Signal Processing

Figure 6:
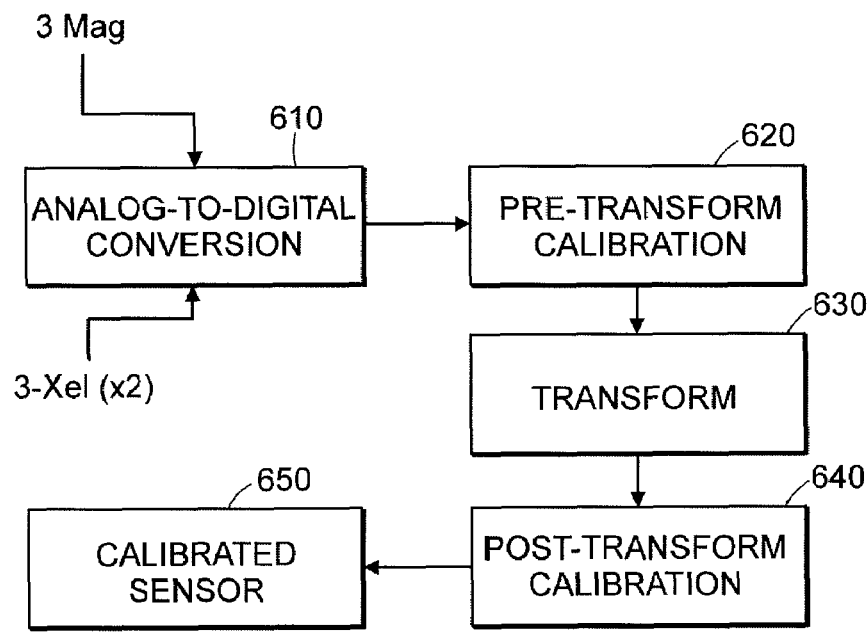
FIGS. 6 and 7 are flowcharts.

A high level flow diagram of the sensor data processing is shown in FIG. 6. The processing of sensor data, including an analog-to-digital conversion step (step 610), a pre-transform calibration step (step 620), a transform step (step 630) and a post-transform calibration step (step 640), yields a calibrated sensor (step 650). Several blocks in the flow diagram are described in detail below.

6.1 Pre-Transform Calibration

Figure 7:
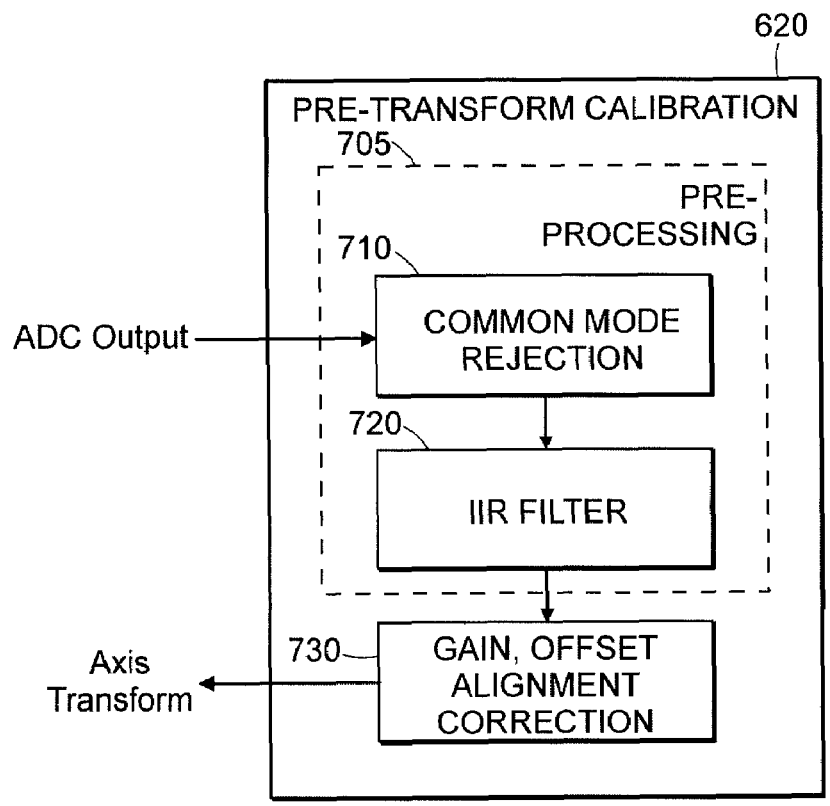

After analog-to-digital conversion of the raw sensor signals (step 610), the digitized signals are processed in a pre-transform calibration step (step 620). This processing on the raw output of the sensor output includes a number of steps as shown in FIG. 7. The individual sensor signals from each axis are corrected for common mode errors, random noise, and sensor and electronics corrections related to gain, offset, and axes alignment. This section first defines the coordinate system used in computations and then describes in detail the require correction computations.

6.2 Coordinate Systems

An individual sensor output from the magnetometers and the accelerometers is taken from an analog-to-digital converter (ADC) for each channel of the multi-axis sensors. These digitized sensor readings are defined herein as "raw" readings and are the input for the subsequent processing.

As introduced above, the magnetometer subsystem 110 uses a 3-axis fluxgate device 112 (see FIG. 1) with axes designated as (x,y,z). As illustrated in FIG. 2, the x-axis is nominally aligned with the case of the system and points in the direction toward the electronic connector (which is defined as "North" pointing for the system), the y-axis nominally points athwart ship to port at zero roll angle. The z-axis points vertically downward (toward the center of the Earth) at zero roll and zero pitch angles.

The accelerometer subsystem 120 includes two 3-axis accelerometers 122, 124. As illustrated in FIG. 2, the coordinate systems for the accelerometer devices are defined with the following convention. For accelerometer #1 (122), the coordinate system is left-handed and is the same as the magnetometer coordinate system with a 180° rotation about the z-axis. For accelerometer #2 (124), the coordinate system is right-handed with the x-axis nominally aligned with the case of the system pointing toward the electronic connector, the y-axis nominally points athwart ship to port at zero roll angle, and the z-axis points vertically upward (away from the center of the Earth) at zero roll and zero pitch angles.

The accelerometers are used to estimate the sensor body roll and pitch attitude with respect to the local gravity vector. This information is used to align the magnetometer axes with the plane of the Earth's local tangent and thence to estimate heading using the geomagnetic field.

6.2.1 Preprocessing

There are nine individual sensor outputs from the ADC, three magnetometer axes and six accelerometer axes. For each of these axes two preprocessing steps are used to compensate for common mode DC errors and to reduce random noise using an infinite impulse response (IIR) digital filter, during a preprocessing stage 705.

6.2.1.1 Common Mode Rejection

For each of the axes, a common mode rejection (CMR) computation (step 710) of the following form is performed:

$$Q_{CMR} = \frac{Q_+ - Q_-}{2}, \quad (1)$$

where Q is a placeholder variable name with $Q_+$ representing the "positive" polarity axis and $Q_-$ representing the "negative" polarity axis. To make this concrete, consider the accelerometer x-axis CMR computation $$G_{xCMR} = \frac{G1_x - G2_x}{2}, \quad (2)$$

where $G1_x$ represents the output of the x-axis for accelerometer #1 and $G2_x$ represents the output of the x-axis for accelerometer #2.

In some examples of the system, as illustrated in FIGS. 1-2, there is only one set of physical sensing axes, as illustrated for the fluxgate 112 axes in FIG. 2. These axes correspond to the "positive" magnetometer axes. To create the corresponding "negative" axes the polarity of the sensor drive current, voltage sense, and feedback current is reversed electronically by using the switch 113, which uses a DPDT (Double Pole Double Throw) MUX (implemented using switches 322, see FIG. 4) to reverse the two terminals of the fluxgate itself. The result for each magnetometer axis is defined to be positive with current in the direction corresponding to a "coil" signal (C) and is defined to be negative with current of the opposite polarity corresponding to a "coil-bar" signal (CB). Hence, the form of the CMR computation for the magnetometer is, for example, $$H_{xCMR} = \frac{H_{xC} - H_{xCR}}{2}, \quad (3)$$

where $H_x$ is the output of the magnetometer x-axis with coil (C) or coil-bar (CB) as indicated.

Using the above conventions, the table shown in FIG. 8 shows the six computations that must be performed on the accelerometer and magnetometer axes to determine the CMR signals.

6.2.1.2 IIR Filter

Each of the six CMR signals is next subjected to a low-pass smoothing digital filter (step 720) to improve signal-to-noise ratio. The form of the filter is a simple IIR exponential averaging filter.

The filter is implemented on a sample-by-sample basis as new data are available from the ADC (after CMR correction). The filter equation is defined as $$Q_{IIR}[n] = (1-\beta)Q_{IIR}[n-1] + \beta Q_{CMR}[n-1], \quad (4)$$

where [n] represents the current value of the digital sample stream, [n−1] represents the previous value of the digital sample stream, $Q_{IIR}$ represents the output of the IIR filter, $Q_{CMR}$ represents the output of the common-mode-rejection computation, and $\beta = 2^{-m}$ is a weighting factor with m=0, 1, 2, 3, . . . Q is a surrogate variable and for the computations takes on the value of $H_{x,y,z}$ or $G_{x,y,z}$, as appropriate.

The frequency response corresponding to the IIR filter of Equation (4) may be written as $$\left|\frac{Y(\phi)}{X(\phi)}\right|^2 \equiv |H(\phi)|^2 = \frac{\beta^2}{2(1-\beta)(1-\cos\phi)+\beta^2}, \quad (5)$$

where β is the filter weight that prescribes the low-pass corner frequency, $\phi=2\pi f\tau$ is dimensionless phase, $f$ is frequency in Hz, and τ is the fixed time interval in seconds between successive digital samples in the sample stream. By solving Equation (5) for β as a function of the low-pass corner frequency, $f_L$, we can select $\beta$ to achieve certain performance features. Similarly, for a given $\beta$ we can compute the corresponding low-pass corner frequency, $f_L$. The equations for these computations are as follows:

$$\beta = (\cos\phi_L - 1) + \sqrt{(1 - \cos\phi_L)^2 + 2(1 - \cos\phi_L)}, \quad (6)$$

$$\phi_L = 2\pi f_L \tau, \quad \text{and}$$

$$f_L = \frac{1}{2\pi\tau} \cos^{-1}\left(1 - \frac{\beta^2}{2(1-\beta)}\right), \quad \text{where } f_L = \frac{\phi_L}{2\pi\tau}. \quad (7)$$

Since $\beta$ takes on discrete values of m=0, 1, 2, . . . , we can compute the discrete values of the dimensionless frequency parameter, $\phi_L$ or, given a sampling interval, $\tau$, we can compute the discrete values of the corner frequency, $f_L$. The table in FIG. 9 shows low-pass filter parameters for discrete values of m and for $\tau=0.01$, i.e., 100 Hz sampling rate. Also shown in FIG. 9 is the reciprocal of the corner frequency, $T_L$, which gives an estimate of the IIR filter settling time needed for the cited case.

With suitably selected values for $\beta$, Equation (4) is applied to each of the six CMR corrected signals that are computed as shown in the table in FIG. 8. The result is a set of six filtered signals; namely for the magnetometer the signals are $H_{xIIR}$, $H_{yIIR}$, and $H_{zIIR}$ and for the accelerometer the signals are $G_{xIIR}$, $G_{yIIR}$, and $G_{zIIR}$.

6.2.2 Gain, Offset, Alignment Corrections

For each of the sensor axes a correction for misalignment of the axes and adjustments for differences in physical and electronic gain and offset is computed (step 730). The correction is based, in part, on a so-called mx+b calculation. All of the preprocessing steps defined above are applied to the input data stream from the ADC regardless of the sensor situation, i.e., whether the sensor is being calibrated or being used to sense operational signals.

In the pre-transform calibration, described in this section, the sensor is subjected to controlled conditions. Two constraints are placed on the sensor:

Sensor is successively placed in a V-block at zero roll and at 180° roll and

Sensor is allowed to remain stationary for sufficiently long that the IIR filter output has reached steady state.

In each of the V-block positions, after the IIR filter has stabilized, a recording is made of the magnetometer and accelerometer measurements. Specifically, the values used are $H_{x0}$, $H_{y0}$, $H_{z0}$, $G_{x0}$, $G_{y0}$, $G_{z0}$, and $H_{x180}$, $H_{y180}$, $H_{z180}$, $G_{x180}$, $G_{y180}$, $G_{z180}$.

These values are used to compute the coefficients of the correction equation, which may be expressed as $$Q_{xcal} = K_{xgain}Q_{xIIR} + K_{xoffset}Q_{xIIR} + K_{dXdZ}Q_{zIIR} + K_{dXdY}Q_{yIIR}, \quad (8)$$

where the $Q_{(\cdot)IIR}$ are the output of the IIR preprocessing filter, and the $K_{(\cdot)}$ are coefficients computed as shown below using the values determined in the V-block test.

The first two terms on the right-hand side of Equation (8) are adjustments for the gain and offset of the sensor and the associated electronics. The "mx+b" name for Equation (8) derives from these two terms, where the "m" is identified as $K_{xgain}$ and the "b" is identified as $K_{xoffset}$. While the form of this equation appears to resemble mx+b, this is really only a single point correction equation. There is no "slope" and "intercept" per se; these are simply correction coefficients related to the particular sensor and its construction. The last two terms in Equation (8) are correction for misalignment of the sensor axes, i.e., corrections for deviations away from the axes being precisely orthogonal.

7 Mathematical Aspects of Data Calibration and Measurement

Mathematical aspects that are used in the design of examples of the system are discussed in this section. Note that the derivations set forth are not necessarily the only ways of configuring examples of the system.

7.1 General Set-up 7.1.1 Definition of Axes

Figure 10:
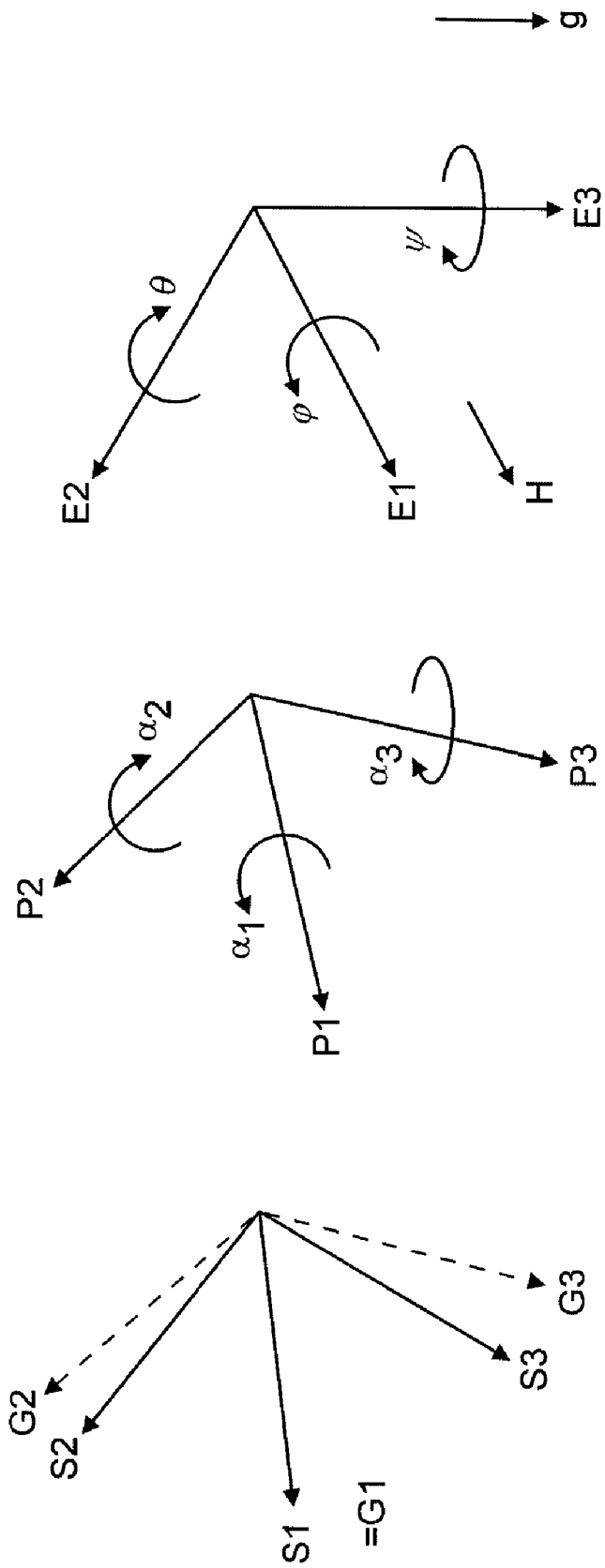
FIG. 10 is a perspective view of coordinate axes.

Referring to FIG. 10, the axes of the sensor (either an accelerometer or a magnetometer) are S1, S2 and S3. In general, these are non-orthogonal and are not aligned with the projectile axes. They are related to an orthogonal coordinate set G1, G2, G3 via Gram-Schmidt orthogonalization. The orthogonal projectile coordinate system is denoted by P1, P2 and P3. Finally, the orthogonal earth system is denoted by E1, E2 and E3 in which the E1 axis is aligned with the magnetic field (H) and the E3 axis is aligned with the gravitational field (g).

In FIG. 10, the sensor, Gram-Schmidt, projectile, and earth axes (denoted by S, G, P, and E respectively). The Gram-Schmidt and projectile axes are related via rotations through three angles $\alpha_1$, $\alpha_2$, $\alpha_3$ analogous to Euler angles. The projector and earth axes are related by rotations through Euler angles $\phi$, $\theta$, $\psi$.

7.1.2 Relationship Between Sensor Frame {S1,S2,S3} & Projectile Frame {P1,P2,P3}

The sensor frame is related to the projectile frame by orthogonalization and by rotations. The orthogonalization transformation can be represented by a Gram-Schmidt matrix. We take the S1 and P1 axes to be identical, and the matrix to transform from the sensor axes to the Gram-Schmidt is as follows:

$$\underline{\underline{T}}_S^G = \begin{pmatrix} 1 & 0 & 0 \\ -\lambda_2^{-1} \underline{e}_2^S \cdot \underline{e}_1^G & \lambda_2^{-1} & 0 \\ -\lambda_3^{-1} \underline{e}_3^S \cdot \underline{e}_1^G & -\lambda_3^{-1} \underline{e}_3^S \cdot \underline{e}_2^G & \lambda_3^{-1} \end{pmatrix}, \quad (9)$$

$$\lambda_i = \left\| \underline{e}_i^G - \sum_{j=1}^{i} (\underline{e}_i^G \cdot \underline{e}_j^S) \underline{e}_j^S \right\|$$

where $\underline{e}_i^A$ is a unit vector pointing in the i-direction in the frame denoted by superscript A. Note that since the sensor coordinate system is not orthogonal, the transformation matrix $\underline{\underline{T}}_S^G$ is not orthogonal, and therefore its inverse does not equal its adjoint.

We define rotations, analogous to the Euler angle rotations, to transform between the projectile frame and the frame determined via Gram-Schmidt orthogonalization. Specifically, we assume that rotations through $\alpha_3$ about the P3-axis, $\alpha_2$ about the P2-axis and $\alpha_1$ about the P1-axis (in that order) transform the projectile axes to the Gram-Schmidt axes. Then the rotation matrix from the Gram-Schmidt vectors to the projectile axes is $$\underline{T}_{G}^{P} = \begin{pmatrix} \cos(\alpha_2)\cos(\alpha_3) & \sin(\alpha_2)\sin(\alpha_1)\cos(\alpha_3) - \cos(\alpha_1)\sin(\alpha_3) & \sin(\alpha_2)\cos(\alpha_1)\cos(\alpha_3) + \sin(\alpha_1)\sin(\alpha_3) \\ \cos(\alpha_2)\sin(\alpha_3) & \sin(\alpha_2)\sin(\alpha_1)\sin(\alpha_3) + \cos(\alpha_1)\cos(\alpha_3) & \sin(\alpha_2)\cos(\alpha_1)\sin(\alpha_3) - \sin(\alpha_1)\cos(\alpha_3) \\ -\sin(\alpha_3) & \cos(\alpha_2)\sin(\alpha_1) & \cos(\alpha_2)\cos(\alpha_1) \end{pmatrix} \quad (10)$$

and $$\underline{T}_{S}^{P} = \underline{T}_{G}^{P} \cdot \underline{T}_{S}^{G} \quad (11)$$

is the transformation matrix from the sensor to the projectile frame. Then vectors measured in the sensor frame (S) can be converted to the corresponding vectors in the projectile frame (P) using the relationship $$\underline{v}^P = \underline{T}_S^P \cdot \underline{v}^S \quad (12)$$

7.1.3 Relationship Between Projectile Frame {P1,P2,P3} & Earth Frame {E1,E2,E3}

The projectile coordinate frame is related to the earth coordinate frame by rotations through the Euler angles (pitch—$\theta$, roll—$\phi$ and heading—$\psi$), which give rise to the following transformation matrix from the projectile axes to the earth axes:

$$\underline{T}_{P}^{E} = \begin{pmatrix} \cos(\theta)\cos(\psi) & \sin(\theta)\sin(\varphi)\cos(\psi) - \cos(\varphi)\sin(\psi) & \sin(\theta)\cos(\varphi)\cos(\psi) + \sin(\varphi)\sin(\psi) \\ \cos(\theta)\sin(\psi) & \sin(\theta)\sin(\varphi)\sin(\psi) + \cos(\varphi)\cos(\psi) & \sin(\theta)\cos(\varphi)\sin(\psi) - \sin(\varphi)\cos(\psi) \\ -\sin(\theta) & \cos(\theta)\sin(\varphi) & \cos(\theta)\cos(\varphi) \end{pmatrix} \quad (13)$$

Then vectors can be transformed from the sensor to the earth frame using the relationship $$\underline{v}^E = \underline{T}_P^E * \underline{T}_S^P * \underline{v}^S = \underline{T}_P^E * \underline{v}^P, \quad (14)$$

$$v_i^E = \sum_{j,k=1}^{3} (T_P^E)_{ij}(T_S^P)_{jk}(v^S)_k = \sum_{j=1}^{3}(T_P^E)_{ij}(v^P)_j$$

7.2 Relating These Transformations to Calibrations

First, all accelerometer and magnetometer readings are corrected for offset and gains. Then the calibration matrix is determined by measuring the sensor reading on the j-axis (in the sensor frame) when the system is accelerated in the i-direction (in the projectile frame) to obtain the i-j entry.

$$\left(\underline{T}_S^P\right)_{ij} = \underline{e}_i^p \cdot \underline{e}_j^s \Rightarrow \underline{e}_i^p = \sum_{j=1}^{3}\left(\underline{T}_S^P\right)_{ij} \underline{e}_j^s \quad (15)$$

The (small) off-diagonal terms are the so-called "cross-product" terms ("dXdY", dYdZ" and "dZdX").

We demonstrate how the calibration matrix is calculated via an example. The term $(T_s^p)_{11}$ is determined by taking 100 readings of $G_x^S$ and $G_z^S$ when the accelerometer is in the gravitational field. The projectile is then rotated through a roll angle of 180 degrees, and the measurements are repeated. Then $$\left(\underline{T}_s^p\right)_{31} = \frac{G_x^p(\varphi = 0) - G_x^p(\varphi = 180)}{G_z^p(\varphi = 0) + G_z^p(\varphi = 180)} \quad (16)$$

Note that $(T_s^p)_{ij} \neq (T_s^p)_{ji}$, indicating the "dx dy≠dy dx".

7.3 Relating These Transformations to Measurements

7.3.1 Determining Roll and Pitch from Accelerometer Measurements

When measuring the earth's gravitational field which is aligned with the z-coordinate in the earth frame, Equation (14) reduces to the form $$\left(\underline{T}_p^E\right)^y \cdot \begin{pmatrix} 0 \\ 0 \\ -g \end{pmatrix} = -g\begin{pmatrix} -\sin(\theta) \\ \cos(\theta)\sin(\varphi) \\ \cos(\theta)\cos(\varphi) \end{pmatrix} = \underline{v}^p = \begin{pmatrix} G_x^p \\ G_y^p \\ G_z^p \end{pmatrix} \quad (17)$$

where we have used the result $(T_P^E)^{-1} = (T_P^E)^T$. Therefore roll and pitch can be determined as follows:

$$\varphi = \tan^{-1}\left(\frac{G_y^p}{G_z^p}\right), \quad \theta = -\tan^{-1}\left(\frac{G_x^p}{\sqrt{(G_y^p)^2 + (G_z^p)^2}}\right) \quad (18)$$

7.3.2 Determining Heading from Magnetometer Measurements

The heading angle can be determined as follows: consider the decomposition of the Euler transformation matrix into the three separate rotations (notation as in *Harkins*, 2003). From Equation (14) we can deduce $$\underline{T}_p^E = \underline{E}_1^y * \underline{E}_2^y * \underline{E}_3^y \Rightarrow \underline{E}_3 * \underline{v}^E = \underline{E}_2^y * \underline{E}_3^y * \underline{v}^P \quad (19)$$

where $$\underline{E}_i^{-2} = \underline{E}_t^p, \quad (20)$$

$$i = 1, 2, 3, \underline{E}_2^r * \underline{E}_3^r = \begin{pmatrix} \cos(\theta) & \sin(\theta)\sin(\varphi) & \sin(\theta)\cos(\varphi) \\ 0 & \cos(\varphi) & -\sin(\varphi) \\ -\sin(\theta) & \cos(\theta)\sin(\varphi) & \cos(\theta)\cos(\varphi) \end{pmatrix}$$

Since the magnetic field in the earth's frame points in the x-direction, Equation (19) can be written as $$\begin{pmatrix} \cos(\psi)H_s^E \\ -\sin(\psi)H_x^E \\ 0 \end{pmatrix} = \begin{pmatrix} \cos(\theta)H_s^P + \sin(\theta)\sin(\varphi)H_y^P * \sin(\theta)\cos(\varphi)H_z^P \\ \cos(\varphi)H_y^P - \sin(\varphi)H_z^P \\ -\sin(\theta)H_s^P + \cos(\theta)\sin(\varphi)H_z^P + \cos(\theta)\cos(\varphi)H_z^P \end{pmatrix} \quad (21)$$

which leads to the result $$\psi = \tan^{-1}\left(\frac{\cos(\varphi)H_s^P - \sin(\varphi)H_z^P}{\cos(\theta)H_s^P + \sin(\theta)\sin(\varphi)H_y^P + \sin(\theta)\cos(\varphi)H_z^P}\right) \quad (22)$$

Note that there is an implicit choice of sign for cosine calculated in Equation (18). Note also that the z-equation in Equation (21) is not used and therefore need not be calculated in software.

Although the above method works in theory, in some examples errors in the calibration lead to a variation in the heading angle as the roll angle is varied. Therefore for some examples of the system, a second "calibration" is performed in which the first mode of variation with roll angle is subtracted out.

It is to be understood that the foregoing description is intended to illustrate and not to limit the scope of the invention, which is defined by the scope of the appended claims. Other embodiments are within the scope of the following claims.

What is claimed is:

1. A method for sensing orientation comprising:
   generating a first set of complementary signals each from a corresponding different measurement component, the complementary signals representing each of one or more characteristics, the complementary signals including related error components;
   determining a measurement value for each of the characteristics by combining the first set of complementary signals to reduce effects of the error components in the complementary signals; and
   generating a second set of complementary signals from a configurable measurement component, including generating one of a plurality of complementary signals in each of a corresponding plurality of configurations of the measurement component, wherein the plurality of complementary signals including at least two complementary signals corresponding to two opposite sensing orientations of the configurable measurement component;
   wherein generating the first set of complementary signals representing each of one or more characteristics includes generating signals with a substantially symmetric transfer function between the characteristic and the signal.

2. The method of claim 1 wherein generating the second set of complementary signals includes generating signals from a magnetometer configurable to generating a different one of the complementary signals in each of two polarities of the magnetometer.

3. The method of claim 2 further comprising calibrating the magnetometer in absence of substantial interference and estimating a degree of error in measurement values provided by the magnetometer in the presence of an interference.

4. The method of claim 3 wherein estimating a degree of error in measurement values provided by the magnetometer is performed in the presence of an iron interference.

5. The method of claim 3 wherein the degree of error comprises a quantity characterizing an RMS error in heading.

6. The method of claim 1 wherein generating the first set of complementary signals includes generating complementary signals for each of three substantially orthogonal components of magnetic characteristics and three substantially orthogonal components of orientation.

7. The method of claim 1 wherein the system is configured to measure orientation, and to measure magnetic characteristics, and to compute an orientation of using measurement values for the orientation and from the magnetic characteristics.

8. A sensor system comprising:
   a first measurement subsystem including a driver and a measurement component, the measurement component including a plurality of sensors for generating complementary signals representing each of one or more characteristics, the complementary signals representing a characteristic and including related error components;
   wherein the driver is configured to accept the complementary signals for a characteristic and to determine a measurement value for the characteristic by combining the complementary signals to reduce effects of the related error components in the complementary signals;
   a second measurement subsystem comprising a driver and a measurement component, the measurement component of the second measurement system being configurable for generating one of a plurality of complementary signals in each of a corresponding plurality of configurations;
   wherein the measurement component of the second measurement subsystem comprises a magnetometer configurable to be coupled to the driver in two opposite polarities, each of the two polarities for generating a different one of the complementary signals;
   wherein the magnetometer includes a two-terminal fluxgate coil, and a switching circuit that includes two configurations for coupling terminals of the coil to the driver;
   wherein the switching circuit includes a first switching component for switching a polarity of a signal from the fluxgate coil to the driver at a predetermined frequency for generating an AC signal at the predetermined frequency, the first switching component being AC coupled to the driver for processing the AC signal; and
   wherein the AC signal has a peak-to-peak magnitude twice the magnitude of the signal from the fluxgate coil to the driver in the absence of the first switching circuit.

9. A sensor system comprising:
   a sensor module for generating a sensor signal representing each of one or more characteristics, the sensor signal including a plurality of complementary signals each representing a characteristic, and for each characteristic, each complementary signal representing the characteristic being representative of a different sensing orientation of the characteristic;
   a controller for generating a control signal for selecting successive sensing orientations; and
   a signal processing module for generating an output signal from at least some of the complementary signals for providing a measurement value of at least some of the characteristics by combining the complementary signals associated with different sensing orientations;
   wherein the controller and the signal processing module are configured to attenuate signals outside a frequency band determined at least in part by a frequency of the selection of successive sensing orientations.

10. The sensor system of claim 9, wherein the frequency band is further determined by a second frequency associated with electronic characteristics of the signal processing module.

11. The sensor system of claim 10, wherein the signal processing module includes an integrator, and the second frequency is further associated with characteristics of the integrator.

12. The sensor system of claim 9, wherein combining the complementary signals associated with different sensing orientations includes alternately integrating the complementary signals to generate an AC signal for providing the measurement value.

13. The sensor system of claim 12, wherein the signal processing module is further configured to measure a peak-to-peak amplitude of the AC signal for providing the measurement value.

* * * * *